US012059894B2

(12) United States Patent
Motegi

(10) Patent No.: US 12,059,894 B2
(45) Date of Patent: Aug. 13, 2024

(54) LIQUID DISCHARGE APPARATUS AND LIQUID DISCHARGE METHOD

(71) Applicant: Akio Motegi, Tokyo (JP)

(72) Inventor: Akio Motegi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 176 days.

(21) Appl. No.: 17/659,528

(22) Filed: Apr. 18, 2022

(65) Prior Publication Data

US 2022/0396072 A1 Dec. 15, 2022

(30) Foreign Application Priority Data

Jun. 10, 2021 (JP) ................................ 2021-097567

(51) Int. Cl.
*B41J 2/045* (2006.01)

(52) U.S. Cl.
CPC ......... *B41J 2/04573* (2013.01); *B41J 2/0458* (2013.01); *B41J 2/04581* (2013.01)

(58) Field of Classification Search
CPC ... B41J 2/04573; B41J 2/0458; B41J 2/04581
See application file for complete search history.

(56) References Cited

U.S. PATENT DOCUMENTS

2012/0249644 A1* 10/2012 Shimizu ................. B41J 2/2135 347/14

FOREIGN PATENT DOCUMENTS

JP 2006-284406 10/2006
JP 2011-067991 4/2011
JP 2012-201094 10/2012
JP 2016-221912 12/2016

* cited by examiner

*Primary Examiner* — Jason S Uhlenhake
(74) *Attorney, Agent, or Firm* — IPUSA, PLLC

(57) ABSTRACT

A liquid discharge apparatus includes a liquid discharge device and circuitry. The liquid discharge device includes a plurality of rows of nozzles. The circuitry determines a timing at which the plurality of nozzles discharge the liquid based on a density of a plurality of patch images. Each of the plurality of patch images includes a reference dot and an adjustment dot. The reference dot and the adjustment dot are formed by the liquid discharged from the plurality of nozzles in a first row and in a second row, respectively, of the plurality of rows of nozzles. The reference dot corresponds to a prescribed base pixel. The adjustment dot corresponds to an adjustment pixel adjacent to the base pixel in the width direction. The adjustment pixel is shifted from the base pixel in the conveyance direction by a number of pixels that differs for each of the plurality of patch images.

7 Claims, 10 Drawing Sheets

LIQUID DISCHARGE APPARATUS AND LIQUID DISCHARGE METHOD

CROSS-REFERENCE TO RELATED APPLICATIONS

This patent application is based on and claims priority pursuant to 35 U.S.C. § 119(a) to Japanese Patent Application No. 2021-097567, filed on Jun. 10, 2021, in the Japan Patent Office, the entire disclosure of which is hereby incorporated by reference herein.

BACKGROUND

Technical Field

Embodiments of the present disclosure relate to a liquid discharge apparatus and a liquid discharge method.

Related Art

In the related art, some technologies to determine a timing at which liquid is discharged by a liquid discharge apparatus based on a result of reading an image formed on a recording medium by the liquid discharged by the liquid discharge apparatus by a reading device are known in the art.

Also, some configurations to determine a timing at which liquid is discharged by a liquid discharge apparatus based on the density of an image formed on a recording medium by the liquid discharged by the liquid discharge apparatus are known in the art.

SUMMARY

In an embodiment of the present disclosure, a liquid discharge apparatus includes a liquid discharge device and circuitry. The liquid discharge device includes a plurality of rows of nozzles through which liquid is discharged. Each of the plurality of rows of nozzles including a plurality of nozzles are arrayed in a width direction of a recording medium orthogonal to a conveyance direction of the recording medium. The liquid discharge device discharges the liquid to the recording medium conveyed in the conveyance direction. The circuitry determines a timing at which the plurality of nozzles in each of the plurality of rows of nozzles discharge the liquid based on a density of plurality of patch images formed on the recording medium by the liquid discharged by the liquid discharge device. Each of the plurality of patch images includes a reference dot and an adjustment dot. The reference dot is formed on the recording medium by the liquid discharged from the plurality of nozzles in a first row of the plurality of rows of nozzles. The reference dot corresponds to a prescribed base pixel. The adjustment dot is formed on the recording medium by the liquid discharged from the plurality of nozzles in a second row of nozzles included in the plurality of rows of nozzles. The adjustment dot corresponds to an adjustment pixel adjacent to the base pixel in the width direction. The adjustment pixel is shifted from the base pixel in the conveyance direction by a number of pixels that differs for each of the plurality of patch images.

In another embodiment of the present disclosure, a liquid discharge method includes discharging and determining. Discharging discharges liquid to a recording medium conveyed in a conveyance direction of the recording medium. The liquid discharge apparatus includes a liquid discharge device having a plurality of rows of nozzles in each of which a plurality of nozzles for discharging the liquid are arrayed in a width direction orthogonal to the conveyance direction. Determining determines a timing at which the plurality of nozzles in each of the plurality of rows of nozzles discharge the liquid based on a density of a plurality of patch images formed on the recording medium by the liquid discharged by the liquid discharge device. Each of the plurality of patch images includes a reference dot and an adjustment dot. The reference dot is formed on the recording medium by the liquid discharged from a first row of the plurality of rows of nozzles corresponding to a predetermined base pixel. The adjustment dot is formed on the recording medium by the liquid discharged from a second row of the plurality of rows of nozzles corresponding to an adjustment pixel shifted from the base pixel by a number of pixels that differs for each of the plurality of patch images in the conveyance direction. The adjustment dot is adjacent to the base pixel in the width direction.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
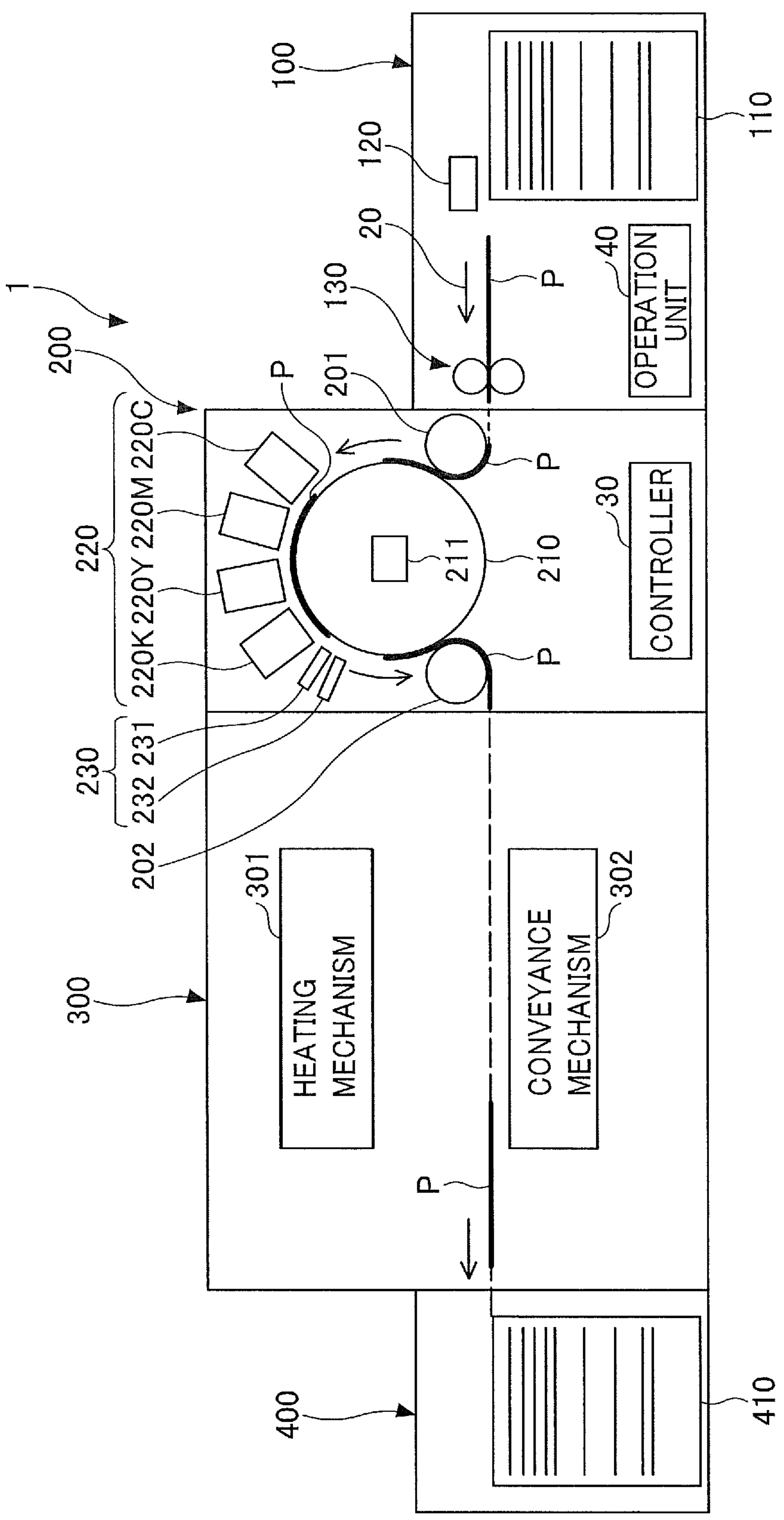
FIG. 1 is a diagram illustrating an overall configuration of an image forming apparatus according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

Embodiments of the present disclosure are described below with reference to the drawings. In the drawings, like reference signs denote like elements, and redundant or overlapping description thereof may be omitted as appropriate.

A liquid discharge apparatus according to an embodiment of the present disclosure includes a liquid discharge device. The liquid discharge device includes multiple rows of nozzles in which multiple nozzles for discharging liquid are arrayed in a width direction of a recording medium conveyed in a conveyance direction. The width direction of a recording medium is perpendicular to the conveyance direction.

In the liquid discharge apparatus according to the present embodiment, the timing at which the liquid is discharged by the multiple nozzles in each of the multiple rows of nozzles may shift from a desired timing. Accordingly, the discharged liquid may land on the recording medium at a position shifted from a desired position.

Such a displacement of the position at which the discharged liquid lands on the recording medium causes the quality of an image formed by, for example, the liquid discharge apparatus on the recording medium to deteriorate.

The liquid discharge apparatus according to the present embodiment includes a determining unit. The determining unit determines a timing at which the multiple nozzles in each of the multiple rows of nozzles discharge liquid, based on the density of images such as multiple patch images formed on a recording medium by the liquid discharged by the liquid discharge device.

Accordingly, the timing at which the multiple nozzles in each of the multiple rows of nozzles discharge the liquid can be adjusted to a desired timing. Accordingly, the quality of the image formed on the recording medium by the liquid discharge apparatus can be ensured.

According to the present embodiment, the liquid that is discharged by the liquid discharge device lands on the recording medium to form multiple dots on the recording medium, and the density of a patch image made of the multiple dots changes depending on how much the multiple dots overlap each other. The liquid discharge apparatus according to the present embodiment utilizes such a change in characteristic described above to determine the timing at which the liquid is discharged.

For example, when a measurement result of positions of the dots on a recording medium is used to determine the timing at which liquid is discharged, a high-resolution measuring device capable of resolving the dots on the recording medium is needed.

By contrast, the liquid discharge apparatus according to the present embodiment uses the density of the patch image on the recording medium to determine the timing at which the liquid is discharged. Accordingly, the liquid discharge apparatus can determine the timing using, for example, relatively low-cost in-line sensors without using a high-resolution and high-cost measuring device.

Meanwhile, in the above-described method in which the timing at which the liquid is discharged is determined based on the density of the patch image, an area in which multiple dots are formed on a recording medium may be small or the multiple dots may not overlap. Accordingly, the density of the patch image formed of the multiple dots may not change.

If the density of the patch image does not change, the determining unit cannot determine the timing at which the liquid is discharged.

In the present embodiment, each of the multiple patch images includes reference dots, each formed in a predetermined base pixel on the recording medium by the liquid discharged from the nozzles in a first row of nozzles included in the multiple rows of nozzles.

Further, each of the multiple patch images includes multiple adjustment dots formed on the recording medium by the liquid discharged from nozzles in a second row of nozzles included in the multiple rows of nozzles. Each of the adjustment dots is adjacent to a corresponding one of the base pixels in the width direction, and the adjustment dots correspond to the adjustment pixels shifted from the base pixels in the conveyance direction by the number of pixels that differs for each of the multiple patch images.

Each of the adjustment dots is shifted from the corresponding one of the base dots in the conveyance direction by the number of pixels that differs for each of the multiple patch images. Accordingly, the determining unit can determine, based on the density of each of the patch images, the timing at which the liquid is discharged by the multiple nozzles in each of the multiple rows of nozzles in accordance with the number of pixels that differs for each of the multiple patch images.

Each of the base pixels and the corresponding one of the adjustment pixels are adjacent to each other in the width direction. Accordingly, each of the reference dots formed in the corresponding one of the base pixels and each of the adjustment dots formed in the corresponding one of the adjustment pixels is likely to merge on the recording medium.

For this reason, the density of each of the multiple patch images changes in accordance with the position of the adjustment dots shifted by the number of pixels. Accordingly, the determining unit can determine the timing at which the liquid is discharged based on the density of the image formed on the recording medium.

The determining unit may typically determine the timing at which the liquid is discharged when the liquid discharge apparatus is shipped from the factory or when the position, i.e., the height of the liquid discharge device with respect to the recording medium is changed by replacing the liquid discharge device after the liquid discharge apparatus has been installed at the customer.

However, the present disclosure is not limited to such an arrangement and the determining unit may determine the timing at which the liquid is discharged at a given timing depending on the intended use of the liquid discharge apparatus.

Embodiments of an image forming apparatus using a liquid discharge method as an ink jet method that discharges liquid from a liquid discharge device to form an image on a recording medium is described in detail as an example of the liquid discharge apparatus according to the present disclosure in the following description.

Note that image formation, recording, printing, printing, and printing in the terms of the embodiments are synonymous.

The configuration of an image forming apparatus 1 according to an embodiment is described with reference to FIGS. 1 and 2.

FIG. 1 is a diagram illustrating an overall configuration of the image forming apparatus 1 according to the present embodiment.

Figure 2:
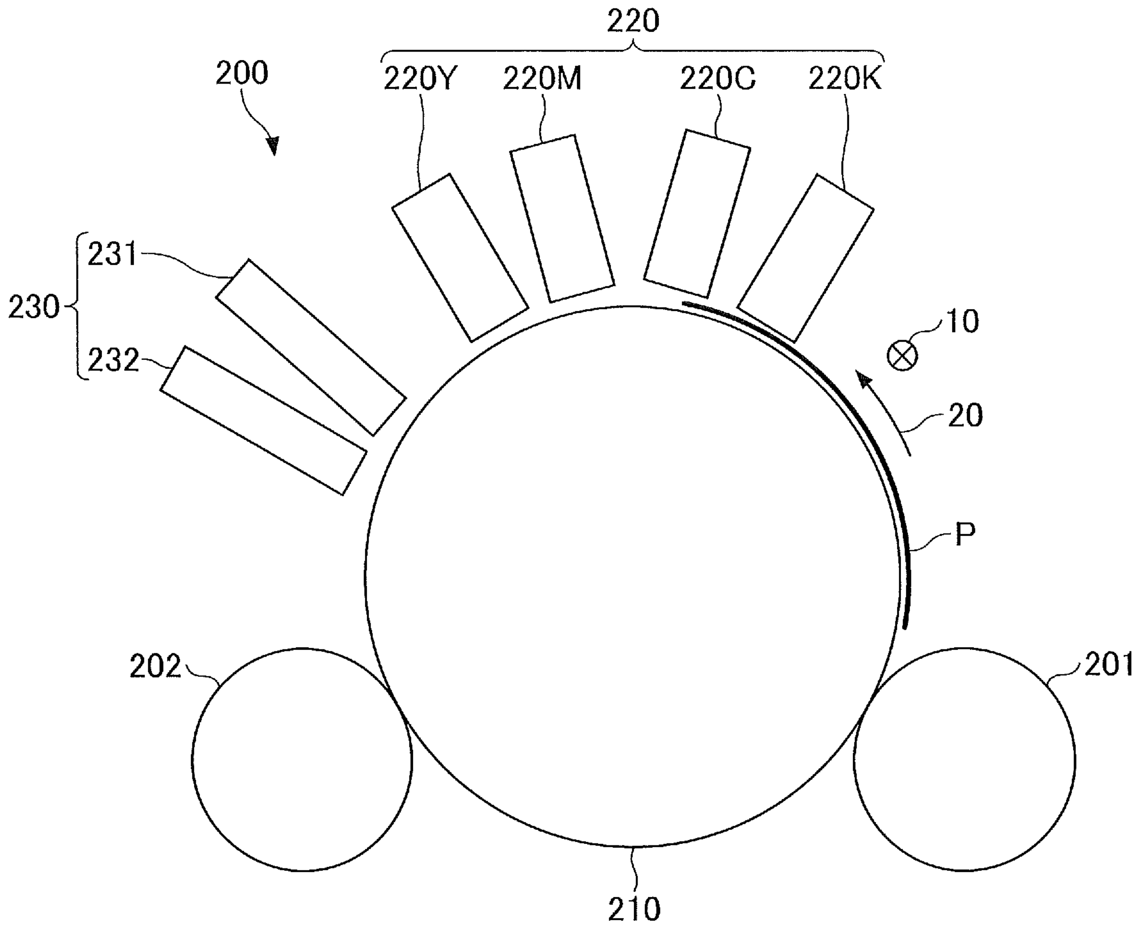
FIG. 2 is a diagram illustrating a configuration of an image forming device provided for the image forming apparatus of FIG. 1.

FIG. 2 is a diagram illustrating a configuration of an image forming device 200 provided for the image forming apparatus 1, according to the present embodiment.

As illustrated in FIG. 1, the image forming apparatus 1 includes a sheet feeder 100, an image forming device 200, a drier 300, a sheet ejection device 400, a controller 30, and an operation panel 40.

In the image forming apparatus 1, the image forming device 200 discharges ink that serves as image forming liquid, and make the ink adhere to a sheet P that serves as a recording medium P fed from the sheet feeder 100. As a result, an image is formed on the sheet P.

After the ink adhered to the sheet P is dried by the drier 300, the sheet P is ejected by the sheet ejection device 400.

The sheet feeder 100 includes a feed tray 110 on which multiple sheets P are stacked, a feeding device 120 for separating and feeding the sheets P one by one from the feed tray 110, and a registration roller pair 130 for feeding the sheets P to the image forming device 200.

Any feeding device such as a device using rollers, a device using air suction can be used as the feeding device 120.

The sheet P that is fed from the feed tray 110 by the feeding device 120 is conveyed in a conveyance direction 20. After a leading end of the sheet P reaches the registration roller pair 130, the registration roller pair 130 is driven at a predetermined timing to feed the sheet P to the image forming device 200.

In the present embodiment, the configuration of the sheet feeder 100 is not limited to any particular embodiment as long as the sheet feeder 100 feeds the sheet P to the image forming device 200.

As illustrated in FIGS. 1 and 2, the image forming device 200 includes a receiving drum 201 for receiving the sheet P fed from the sheet feeder 100, and a sheet bearing drum 210 for bearing and conveying the sheet P conveyed by the receiving drum 201 on the outer peripheral surface of the sheet bearing drum 210.

In addition, the image forming device 200 includes a liquid discharge device 220 for discharging ink toward the sheet P born on the outer peripheral surface of the sheet bearing drum 210, a transfer cylinder 202 for transferring the sheet P conveyed by the sheet bearing drum 210 to the drier 300, and an in-line sensor 230.

After the sheet P has been conveyed from the sheet feeder 100 to the image forming device 200, the leading end of the sheet P is gripped by a sheet gripper disposed on the surface of the receiving drum 201, and the sheet P is conveyed along with the movement of the surface of the receiving drum 201.

The sheet P that is conveyed by the receiving drum 201 is delivered to the sheet bearing drum 210 at a position facing the sheet bearing drum 210.

A sheet gripper is disposed on the surface of the sheet bearing drum 210, and the leading end of the sheet P is gripped by the sheet gripper.

Multiple suction holes are formed in a dispersed manner on the surface of the sheet bearing drum 210, and a suction airflow toward the inside of the sheet bearing drum 210 is generated by the suction device 211 in each of the multiple suction holes. While the leading end of the sheet P delivered from the receiving drum 201 to the sheet bearing drum 210 is gripped by the sheet gripper, the sheet P is attracted to the surface of the sheet bearing drum 210 by the suction airflow and conveyed along with the movement of the surface of the sheet bearing drum 210.

The liquid discharge device 220 discharges ink of four colors of cyan (C), magenta (M), yellow (Y), and black (K) to form an image.

The liquid discharge device 220 includes individual liquid discharge heads 220C, 220M, 220Y, and 220K for each ink color, C, M, Y, and K, respectively.

Each of the liquid discharge heads 220C, 220M, 220Y and 220K includes multiple nozzles for discharging the ink over the entire width of the sheet P so as to form an image over the entire width of the sheet P in the width direction 10 of the sheet P substantially perpendicular to the conveyance direction 20.

Thus, the image forming apparatus 1 is a so-called line-type apparatus that does not move the liquid discharge device 220. Multiple numbers of each of the liquid discharge heads 220C, 220M, 220Y and 220K may be disposed in the width direction 10 so as to form an image over the entire width of the sheet P.

The configuration of the liquid discharge heads 220C, 220M, 220Y, and 220K are not limited to the above-described configuration as long as the liquid discharge heads 220C, 220M, 220Y, and 220K discharge the liquid, and may have any configuration.

As required, a liquid discharge head for discharging a special ink such as the ink of white, gold, silver color may be disposed, or a liquid discharge head for discharging liquid that does not form an image such as a surface coating liquid may be disposed.

Liquid discharge operation of the liquid discharge heads 220C, 220M, 220Y, and 220K are controlled by drive signals corresponding to image data to be printed.

When the sheet P born on the sheet bearing drum 210 passes through a region facing the liquid discharge device 220, ink of each color is discharged from the liquid discharge heads 220C, 220M, 220Y, and 220K. Thus, an image corresponding to the image data is formed on the sheet P.

In the present embodiment, the configuration of the image forming device 200 is not limited as long as the image forming device 200 adheres liquid to form an image on the sheet P.

The in-line sensor 230 is disposed downstream from the liquid discharge device 220 in the conveyance direction 20.

The in-line sensor 230 is an example of a reader that reads multiple patch images formed on a sheet P by ink discharged by the liquid discharge device 220.

The conveyance direction 20 is a rotation direction of the sheet bearing drum 210 in the image forming device 200.

The in-line sensor 230 includes multiple reading pixels disposed over the entire width of the sheet P in the width direction 10.

For example, the in-line sensor 230 includes imaging devices such as charge-coupled devices (CCD) or complementary metal-oxide semiconductors (CMOS), and each of the read pixels is a pixel of an imaging device that outputs an electrical signal corresponding to the received light intensity.

In the present embodiment, the in-line sensor 230 includes reading pixels that output electrical signals corresponding to the light intensities of the received R (red), G (green), and B (blue) colors, and outputs a color read image obtained by reading multiple patch images.

As illustrated in FIG. 1, the drier 300 includes a heating mechanism 301 for drying ink adhered to the sheet P in the image forming device 200, and a conveyance mechanism 302 for conveying the sheet P conveyed from the image forming device 200.

After the sheet P conveyed from the image forming device 200 is received by the conveyance mechanism 302, the sheet P is conveyed through the heating mechanism 301 and delivered to the sheet ejection device 400.

While the sheet P passes through the heating mechanism 301, the ink adhered to the sheet P is subjected to a heat treatment. Accordingly, a liquid component such as moisture in the ink is evaporated, and the ink is fixed onto the sheet P. Moreover, the curl of the sheet P is reduced.

The sheet ejection device 400 includes a sheet ejection tray 410 on which the multiple sheets P are stacked.

Each of the sheets P conveyed from the drier 300 is sequentially stacked and held on the sheet ejection tray 410.

In the present embodiment, the configuration of the sheet ejection device 400 is not limited to such a configuration as described above as long as the sheet ejection device 400 ejects the sheets P.

The controller 30 controls the entire operation of the image forming apparatus 1.

In particular, in the present embodiment, the controller 30 generates patch image data to form multiple patch images on the sheet P with the ink discharged by the liquid discharge device 220.

Then, the controller 30 determines the timing at which the multiple nozzles in each of the multiple rows of nozzles discharge ink based on the density of the multiple patch images formed on the sheet P based on the patch image data.

The controller 30 is disposed in the image forming device 200 in FIG. 1. However, the controller 30 may be disposed at any position inside or installed outside the image forming apparatus 1.

The operation panel 40 includes, for example, a touch panel, a keyboard and receives an operation input to the image forming apparatus 1 by an operator who operates the image forming apparatus 1.

In FIG. 1, the operation panel 40 is disposed in the sheet feeder 100. However, the operation panel 40 may be disposed at any position inside or installed outside the image forming apparatus 1.

The image forming apparatus 1 according to the present embodiment includes the sheet feeder 100, the image forming device 200, the drier 300, the sheet ejection device 400. However, other functional units may be added to the image forming apparatus 1 as needed.

For example, a pre-processing unit that performs pre-processing of image formation may be added between the sheet feeder 100 and the image forming device 200, and a post-processing unit that performs post-processing of the image formation may be added between the drier 300 and the sheet ejection device 400.

Examples of the pre-processing unit may include a pre-treatment unit that performs a processing liquid applying operation to apply processing liquid, which reacts with ink to reduce bleeding, onto the sheet P. However, the content of the pre-processing operation is not particularly limited.

Examples of the post-processing may include a sheet reversing and conveyance processing unit, a binding processing unit, a correction mechanism, and a cooling mechanism.

The sheet reversing and conveyance processing unit reverses the sheet P on which an image has been formed by the image forming device 200 and sends the sheet P to the image forming device 200 again to form images on both sides of the sheet P.

The binding processing unit performs processing for binding multiple sheets P on which images have been formed.

Further, the correction mechanism corrects the deformation of the sheet P, and the cooling mechanism cools the sheet P.

However, there are no particular restrictions on the content of the post-processing.

Figure 3:
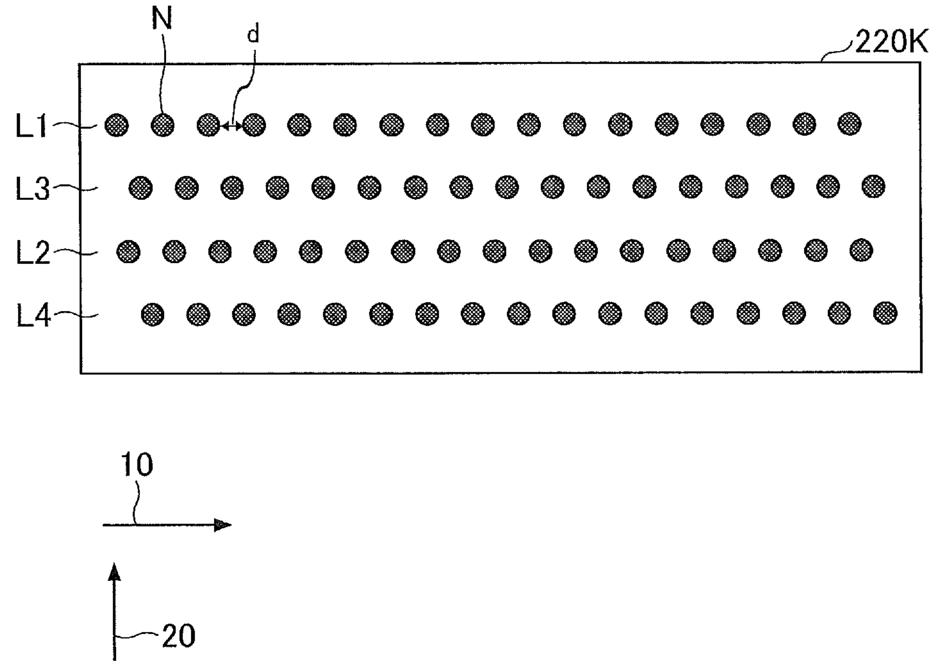
FIG. 3 is a plan view of rows of nozzles on a liquid discharge head, according to an embodiment of the present disclosure.

FIG. 3 is a plan view of rows of nozzles L1, L2, L3, and L4 on a liquid discharge head 220K provided for the image forming device 200, on which rows of nozzles are arranged, according to the present embodiment.

The liquid discharge head 220K includes the four nozzle rows L1, L2, L3, and L4.

Each of the four nozzle rows L1, L2, L3 and L4 has multiple nozzles N arranged in the width direction 10.

In the liquid discharge head 220K, the multiple nozzles N are arranged in a staggered manner.

In the present embodiment, the multiple nozzles N are arranged in a staggered manner means that, for example, each of the nozzles N included in the row of nozzles L3 adjacent to the row of nozzles L1 in the conveyance direction 20 is arranged between a corresponding pair of two nozzles N adjacent to each other in the width direction 10 in the row of nozzles L1.

The ink is discharged from each of the multiple nozzles N.

When the discharged ink lands on the sheet P, dots are formed on the sheet P.

In the present embodiment, each of the dots formed on the sheet P by the ink discharged from the nozzles N of the rows of nozzles L2 and L4 is formed at a position adjacent to a corresponding one of dots formed on the sheet P by the ink discharged from the nozzles N of the row of nozzles L1 in the width direction 10 on the sheet P.

When an interval between two adjacent nozzles N in the rows of nozzles L1, L2, L3, and L4 is an interval d (see FIG. 3), arranging two liquid discharge heads 220K in a manner in which the two liquid discharge heads 220K are shifted by half the interval d in the conveyance direction 20 allows the image forming resolution of the image forming apparatus 1 to be doubled as compared with the case in which one liquid discharge head 220K is disposed in the row of nozzles.

In FIG. 3, the rows of nozzles L1, L2, L3, and L4 of the liquid discharge head 220K is illustrated. However, the rows of nozzles L1, L2, L3, and L4 of the liquid discharge heads 220C, 220M, and 220Y are arranged in a similar manner to the liquid discharge head 220K.

Figure 4:
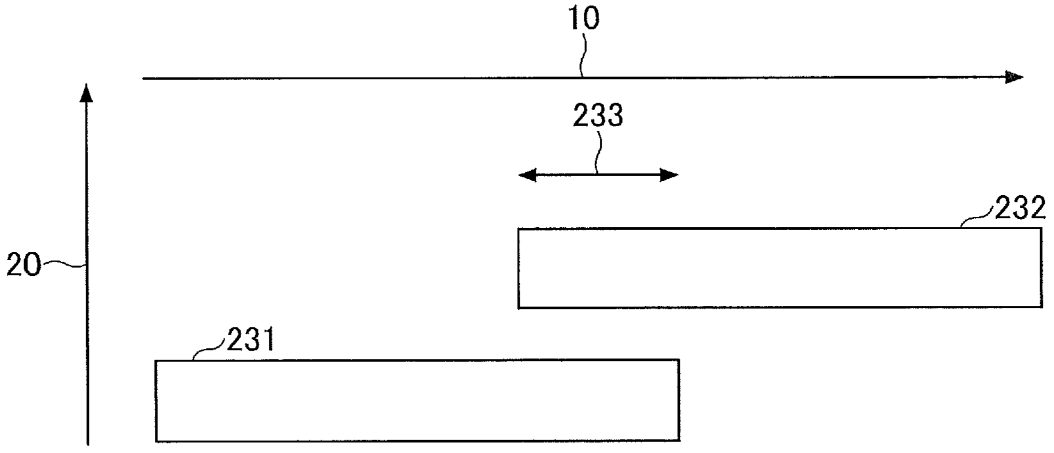
FIG. 4 is a diagram illustrating a first in-line sensor and a second in-line senor of an in-line sensor provided for the image forming apparatus of FIG. 1.

FIG. 4 is a diagram illustrating a first in-line sensor 231 and a second in-line sensor 232 of the in-line sensor 230 provided for the image forming apparatus 1, according to the present embodiment.

The in-line sensor 230 includes the first in-line sensor 231 and the second in-line sensor 232.

The first in-line sensor 231 is disposed upstream from the second in-line sensor 232 in the conveyance direction 20.

The first in-line sensor 231 and the second in-line sensor 232 are disposed at positions shifted from each other in the width direction 10 so that the entire width of the sheet P in the width direction 10 can be read.

An overlapping region 233 is a region in which reading ranges of the first in-line sensor 231 and the second in-line sensor 232 overlap each other in the width direction 10.

As long as the entire width of the sheet P in the width direction 10 can be read, the number of in-line sensors included in the in-line sensor 230 is not limited to two and may be any desired number.

Further, in the present embodiment, the first in-line sensor 231 and the second in-line sensor 232 have a similar configuration and function. However, the configuration and function of the first in-line sensor 231 and the second in-line sensor 232 may not be necessarily similar as long as the sheet P can be read with equivalent quality.

Figure 5:
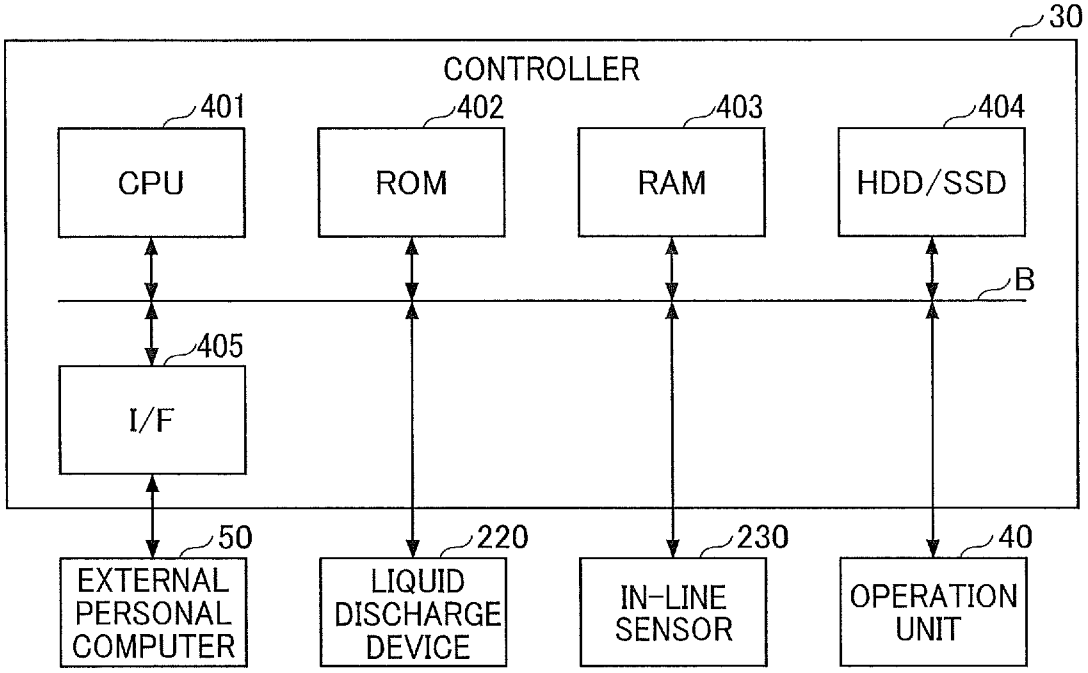
FIG. 5 is a block diagram of a hardware configuration of a controller provided for the image forming apparatus of FIG. 1.

FIG. 5 is a block diagram of the hardware configuration of the controller 30 provided for the image forming apparatus 1, according to the present embodiment.

The controller 30 includes a central processing unit (CPU) 401, a read-only memory (ROM) 402, a random access memory (RAM) 403, a hard disk drive (HDD) or solid-state drive (SSD) 404, and an interface (I/F) 405.

The above-described units are electrically connected to each other via a system bus B and are connected to each of the liquid discharge device 220, the in-line sensor 230, and the operation panel 40 via the system bus B so as to be able to transmit and receive data and signals.

The CPU 401 uses the RAM 403 as a working area and executes a program stored in the ROM 402.

The HDD/SSD 404 is used as a memory and stores setting values set in advance.

The data stored in the HDD/SSD 404 may be read and used by the CPU 401 when the CPU 401 executes a program.

The I/F 405 is an interface that enables communication between the image forming apparatus 1 and an external personal computer (PC) 50.

First Embodiment

Figure 6:
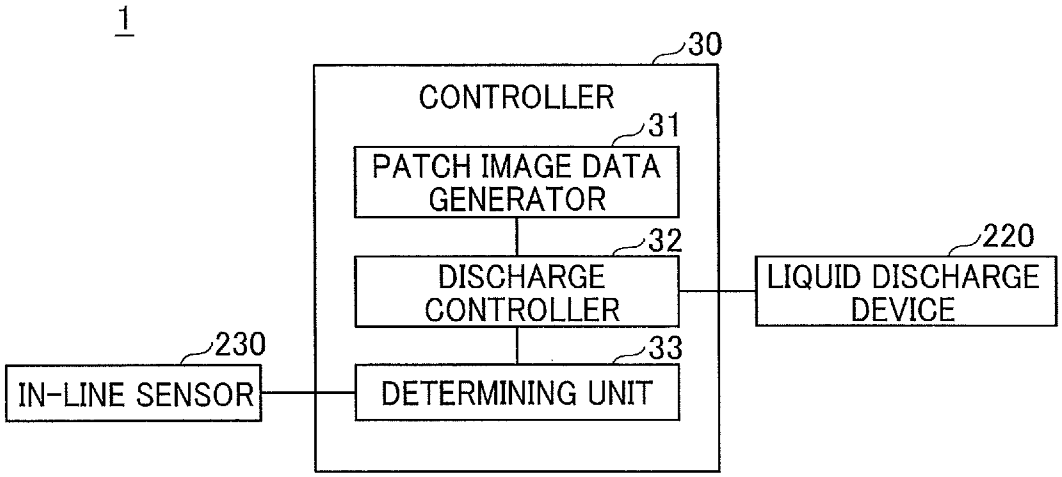
FIG. 6 is a block diagram of a functional configuration of a controller of an image forming apparatus according to a first embodiment of the present disclosure.

FIG. 6 is a block diagram of the functional configuration of the controller 30 provided for the image forming apparatus 1, according to a first embodiment of the present disclosure.

The controller 30 includes a patch image data generator 31, a discharge controller 32, and a determining unit 33.

For example, these functions of the controller 30 are implemented as the CPU 401 of FIG. 5 executes a predetermined program stored in, for example, the ROM 402.

The patch image data generator 31 generates patch image data for forming multiple patch images having different densities on the sheet P by the ink discharged from the liquid discharge device 220.

The discharge controller 32 controls the ink discharge operation by the liquid discharge device 220.

In particular, in the present embodiment, the discharge controller 32 controls the ink discharge operation by the liquid discharge device 220 based on the patch image data generated by the patch image data generator 31.

The discharge controller 32 controls the ink discharge operation by the liquid discharge device 220 such that the nozzles in each of the multiple rows of nozzles L1, L2, L3, and L4 discharge the ink at the timing determined by the determining unit 33.

The determining unit 33 determines the timing at which the nozzles in each of the multiple rows of nozzles L1, L2, L3, and L4 discharge the ink based on the density of each of the multiple patch images formed on the sheet P by the ink discharged by the liquid discharge device 220 under the control of the discharge controller 32.

In the present embodiment, the determining unit 33 determines the timing at which the nozzles in each of the multiple rows of nozzles L1, L2, L3, and L4 discharge the ink based on a read image obtained by reading multiple patch images formed on the sheet P by the in-line sensor 230.

A patch image formed on the sheet P is described with reference to FIGS. 7, 8, 9, 10, 11, 12, 13, and 14.

FIGS. 7, 8, 9, and 10 are diagrams each illustrating patch image data generated by the patch image data generator 31 for forming patch images.

FIGS. 11, 12, 13, and 14 are diagrams each illustrating a patch image formed on a sheet P based on the patch image data of FIGS. 7, 8, 9, and 10, respectively.

Figure 7:
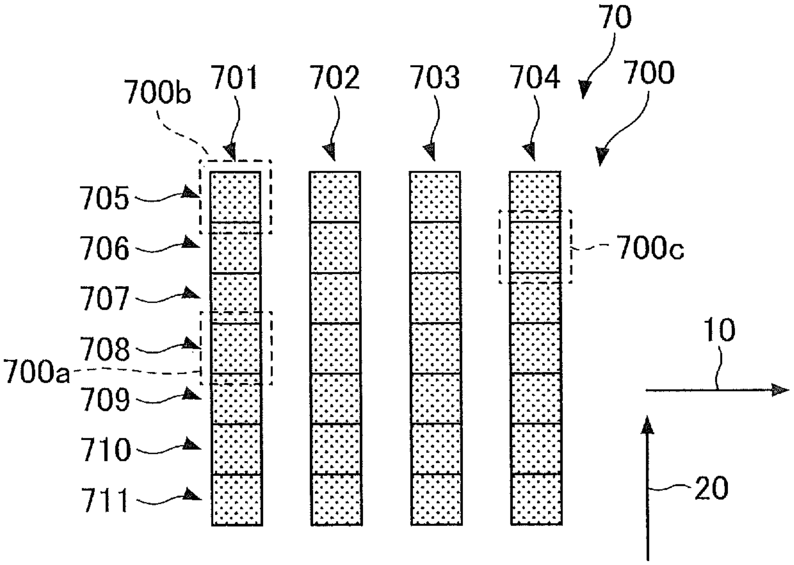
FIG. 7 is an overall view of a group of patch image data according to an embodiment of the present disclosure.

FIG. 7 is an overall view of a group of patch image data 70, according to the present embodiment.

In FIG. 7, each of multiple squares represents patch image data 700 for one patch image.

The group of patch image data 70 includes a total of twenty-eight pieces of the patch image data 700 arranged in a matrix of four columns in the width direction 10 and seven rows in the conveyance direction 20.

The twenty-eight pieces of the patch image data 700 may collectively be referred to as the patch image data 700.

In the group of patch image data 70, each of patch image data columns 701, 702, 703, and 704 includes seven patch image data arranged in the conveyance direction 20.

The patch image data included in the patch image data column 701 causes the ink to be discharged from the nozzles N of the row of nozzles L1 and the row of nozzles L2 to form patch images on the sheet P.

The patch image data included in the patch image data column 702 causes the ink to be discharged from the nozzles N of the row of nozzles L2 and the row of nozzles L3 to form patch images on the sheet P.

The patch image data included in the patch image data column 703 causes the ink to be discharged from the nozzles N of the row of nozzles L3 and the row of nozzles L4 to form patch images on the sheet P.

The patch image data included in the patch image data column 704 causes the ink to be discharged from the nozzles N of the row of nozzles L4 and the row of nozzles L1 to form patch images on the sheet P.

The patch image data generator 31 generates the above-described patch image data columns 701, 702, 703, and 704 for each of the above-described combinations of the rows of nozzles L1, L2, L3, and L4 that are used to form dots adjacent to each other on the sheet P in the width direction 10.

In the present embodiment, the image forming apparatus 1 forms dots adjacent to each other in the width direction 10 on the sheet P in each of the combinations of the row of nozzles L1 and the row of nozzles L2, the row of nozzles L2 and the row of nozzles L3, the row of nozzles L3 and the row of nozzles L4, and the row of nozzles L4 and the row of nozzles L1.

For this reason, in the group of patch image data 70 illustrated in FIG. 7, the patch image data generator 31 generates the patch image data columns 701, 702, 703, and 704 in accordance with the combination of the row of nozzles L1 and the row of nozzles L2, the row of nozzles L2 and the row of nozzles L3, the row of nozzles L3 and the row of nozzles L4, and the row of nozzles L4 and the row of nozzles L1, respectively.

In the group of patch image data 70, each of the patch image data rows 705, 706, 707, 708, 709, 710, and 711 is used to form a corresponding one of the patch images having a different density on the sheet P. Each of the patch image data rows 705, 706, 707, 708, 709, 710, and 711 includes four pieces of patch image data.

Figure 8:
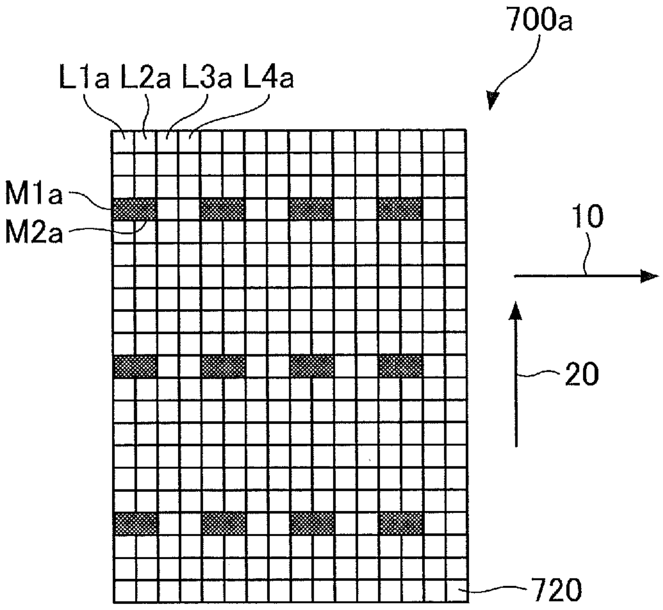
FIG. 8 is a diagram illustrating a first example of the patch image data included in the group of patch image data of FIG. 7.

FIG. 8 is a diagram illustrating a first example of patch image data 700*a* included in the group of patch image data 70, according to the present embodiment. In other words, FIG. 8 is a magnified view of the patch image data 700*a*.

In FIG. 8, multiple pixels 720 that are indicated by multiple small grids on one-by-one basis represent the multiple pixels that together configure the patch image data 700*a*.

The patch image data 700*a* includes a total of three hundred thirty-six pixels 720 arranged in a matrix of sixteen columns in the width direction 10 and twenty-one rows in the conveyance direction 20.

The three hundred thirty-six pixels 720 may collectively be referred to as the pixel 720.

Out of the three hundred thirty-six pixels 720, the pixels 720 that are filled with black represent pixels that cause the ink to be discharged, and the unfilled white pixels 720 represent pixels that does not cause the ink to be discharged.

The image forming apparatus 1 forms dots that constitute a patch image on a sheet P with the ink discharged from nozzles N that correspond to the pixels which cause the ink to be discharged.

Each of a pixel column L1*a*, a pixel column L2*a*, a pixel column L3*a*, and a pixel column L4*a* causes the nozzles N included in each of the row of nozzles L1, the row of nozzles L2, the row of nozzles L3, and the row of nozzles L4, respectively, to discharge the ink to form dots on the sheet P.

Similarly, the pixel column L1*a* for the row of nozzles L1, the pixel column L2*a* for the row of nozzles L2, the pixel column L3*a* for the row of nozzles L3, and the pixel column L4*a* for the row of nozzles L4 are repeatedly arranged in this order from downstream toward upstream in the width direction 10.

The patch image data 700*a* is used by the determining unit 33 to determine the timing at which the ink is discharged from the nozzles N of the row of nozzles L2 with respect to the row of nozzles L1.

In this case, the row of nozzles L1 serves as a first row of nozzles, and the row of nozzles L2 serves as a second row of nozzles.

The patch image data 700*a* does not include pixels that cause the ink to be discharged, i.e., black pixels in the pixel rows L3*a* and L4*a*.

Base pixels M1*a* in the patch image data 700*a* are pixels that cause the ink to be discharged from the nozzles in the row of nozzles L1. The base pixel M1*a* is an example of predetermined base pixels.

Each of adjustment pixels M2*a* in the patch image data 700*a* is adjacent to a corresponding one of the base pixels M1*a* in the width direction 10 and is shifted from the corresponding one of the base pixels M1*a* in the conveyance direction 20 by the number of pixels that differs for each of the multiple patch images. The adjustment pixel M2*a* is an example of adjustment pixels.

In the present embodiment, the adjustment pixel M2*a* is adjacent to the base pixel M1*a* in the width direction 10 means that the adjustment pixel M2*a* and the base pixel M1*a* that cause the ink to be discharged are adjacent to each other in the width direction 10.

However, such an arrangement as described above is not limited to a case in which the adjustment pixel M2*a* and the base pixel M1*a* are shifted by one pixel in the width direction 10.

Even if the adjustment pixel M2*a* and the base pixel M1*a* are separated from each other by two pixels or greater in the width direction 10, the adjustment pixel M2*a* and the base pixel M1*a* can be said to be adjacent to each other in the width direction 10 unless a pixel that causes the ink to be discharged is disposed between the adjustment pixel M2*a* and the base pixel M1*a*.

The adjustment pixel M2*a* and the base pixel M1*a* are not necessarily adjacent to each other in the conveyance direction 20.

The adjustment pixel M2*a* is adjacent to the base pixel M1*a* that causes the ink to be discharged in the width direction 10 and located at a position shifted by 0 pixel from the base pixel M1*a* in the conveyance direction 20.

In the patch image data 700*a*, pixels that cause the ink to be discharged other than the base pixel M1*a* and the adjustment pixel M2*a* are also arranged in a similar positional relation as the above-described positional relation between the base pixel M1*a* and the adjustment pixel M2*a*.

In the group of patch image data 70 of FIG. 7, the patch image data generator 31 generates other patch image data included in a patch image data row 708 in a pixel arrangement similar to the patch image data 700*a*.

Figure 9:
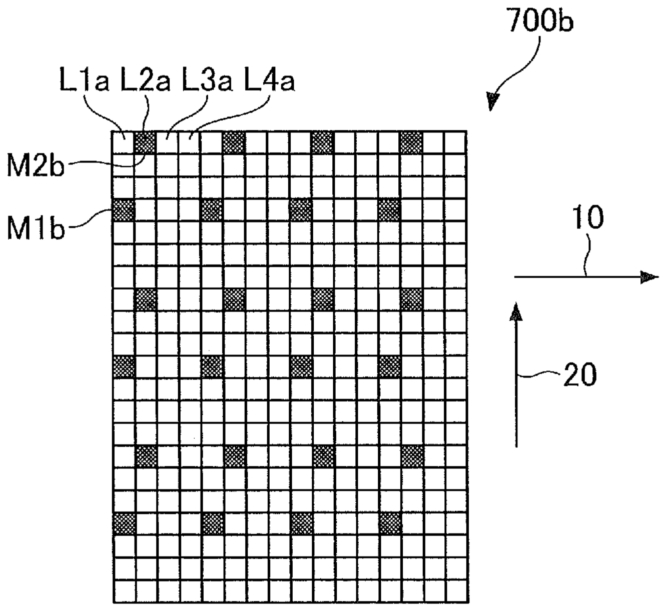
FIG. 9 is a diagram illustrating a second example of the patch image data included in the group of patch image data of FIG. 7.

FIG. 9 is a diagram illustrating a second example of patch image data 700*b*, in which the patch image data 700*b* of the group of patch image data 70 is enlarged, according to the present embodiment.

A basic pixel arrangement of FIG. 9 is equivalent to that of FIG. 8. For this reason, an overlapping description is omitted as appropriate.

The patch image data 700*b* is used by the determining unit 33 to determine the timing at which the ink is discharged from nozzles in the row of nozzles L2 with respect to the row of nozzles L1.

In this case, the row of nozzles L1 serves as a first row of nozzles, and the row of nozzles L2 serves as a second row of nozzles.

Further, the patch image data 700*a* does not include pixels that cause the ink to be discharged, i.e., black pixels in the pixel row L3*a* and the pixel row L4*a*.

A base pixel M1*b* is an example of the base pixels, and an adjustment pixel M2*b* is an example of the adjustment pixels.

The adjustment pixel M2*b* is adjacent to the base pixel M1*b* that causes the ink to be discharged in the width direction 10 and located at a position shifted by three pixels from the base pixel M1*b* in the conveyance direction 20 downstream in the conveyance direction 20.

In the patch image data 700*b*, pixels that cause the ink to be discharged other than the base pixel M1*b* and the adjustment pixel M2*b* are also arranged in a positional relation similar to a positional relation between the base pixel M1*b* and the adjustment pixel M2*b*.

In the group of patch image data 70 of FIG. 7, the patch image data generator 31 generates other patch image data included in the patch image data row 705 based on a pixel arrangement similar to a pixel arrangement of the patch image data 700*b*.

Figure 10:
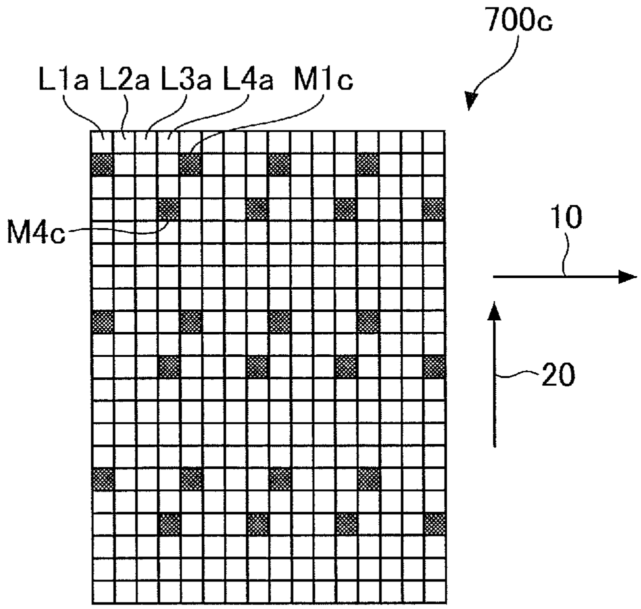
FIG. 10 is a diagram illustrating a third example of the patch image data included in the group of patch image data of FIG. 7.

FIG. 10 is a diagram illustrating a third example of patch image data 700*c* included in the group of patch image data 70, according to the present embodiment. In other words, FIG. 10 is a magnified view of the patch-image data 700*c*.

A basic pixel arrangement of FIG. 10 is equivalent to that of FIG. 8. For this reason, an overlapping description is omitted as appropriate.

The patch image data 700*c* is used by the determining unit 33 to determine the timing at which the ink is discharged from the nozzles in the row of nozzles L1 with respect to the row of nozzles L4. In this case, the row of nozzles L4 serves as the first row of nozzles, and the row of nozzles L1 serves as the second row of nozzles. Further, the patch image data 700*c* does not include pixels that cause the ink to be discharged, i.e., black pixels in the pixel row L2*a* and the pixel row L3*a*.

A base pixel M4*c* is an example of the base pixels, and an adjustment pixel M1*c* is an example of the adjustment pixels.

The adjustment pixel M1*c* is adjacent to the base pixel M4*c* that causes the ink to be discharged in the width direction 10 and located at a position shifted by two pixels from the base pixel M4*c* in the conveyance direction 20 downstream in the conveyance direction 20.

In the patch image data 700*c*, pixels that cause the ink to be discharged other than the base pixel M4*c* and the adjustment pixel M1*c* are also arranged in a positional relation similar to a positional relation between the base pixel M4*c* and the adjustment pixel M1*c*.

In the group of patch image data 70 of FIG. 7, the patch image data generator 31 generates other patch image data included in the patch image data row 706 based on a pixel arrangement similar to a pixel arrangement of the patch image data 700*c*.

As described above, the patch image data generator 31 generates the patch image data included in each of the patch image data rows 705, 706, 707, 708, 709, 710, and 711 in a like pixel arrangement for each of the patch image data rows 705, 706, 707, 708, 709, 710, and 711.

In any of the patch image data rows 705, 706, 707, 708, 709, 710, and 711, each of the adjustment pixels are adjacent to a corresponding one of the base pixels in the width direction 10.

On the other hand, in the conveyance direction 20, each of the adjustment pixels is shifted from a corresponding one of the base pixels by a different number of pixels.

When the shift of a pixel toward downstream in the conveyance direction 20 is represented by − and the shift of a pixel toward upstream in the conveyance direction 20 is represented by +, each of the adjustment pixels is shifted from a corresponding one of the base pixels in the conveyance direction 20 by 0 pixel in the patch image data row 708, −1 pixel in the patch image data row 707, −2 pixels in the patch image data row 706, −3 pixels in the patch image data row 705.

Further, each of the adjustment pixels are shifted from a corresponding one of the base pixels in the conveyance direction 20 by +1 pixel in the patch image data row 709, +2 pixel in the patch image data row 710, +3 pixels in the patch image data row 711.

The density of the patch image formed on the sheet P based on the patch image data is different in accordance with the number of pixels by which each of the adjustment pixels is shifted from the corresponding one of the base pixels in the conveyance direction 20.

The determining unit 33 determines the timing at which the ink is discharged from the nozzles in each of the rows of nozzles L1, L2, L3, and L4 by utilizing the above-described difference in the density of the patch image.

Figure 11:
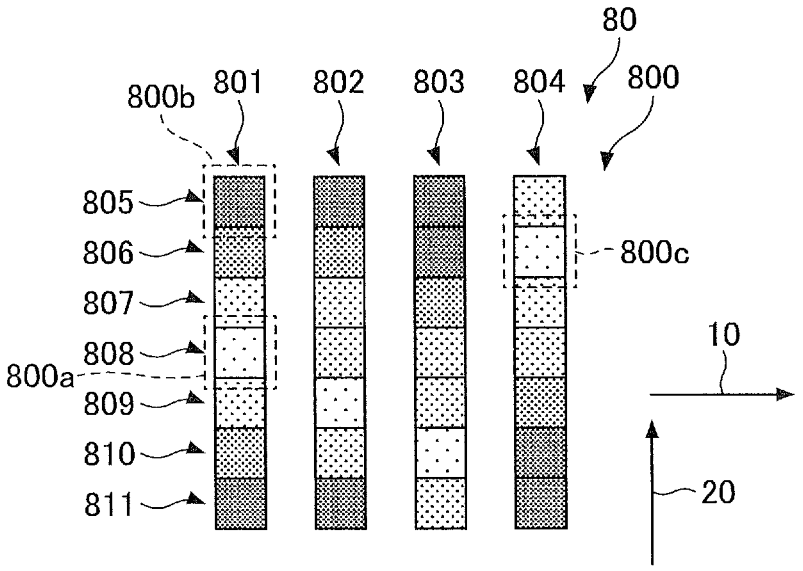
FIG. 11 is a diagram illustrating an entire patch image group based on the patch image data of FIG. 7, according to an embodiment of the present disclosure.

FIG. 11 is a diagram illustrating an entire patch image group 80 including multiple patch images 800 formed on a sheet P based on the group of patch image data 70 of FIG. 7, according to the present embodiment.

The image forming apparatus 1 forms the patch image group 80 in at least a partial region of the sheet P.

In FIG. 11, each of the multiple squares represents one patch image 800.

The patch image group 80 includes a total of twenty-eight patch images 800 arranged in a matrix of four columns in the width direction 10 and seven rows in the conveyance direction 20, corresponding to the group of patch image data 70.

The twenty-eight patch images may collectively be referred to as the patch image 800.

In the patch image group 80, each of the patch image columns 801, 802, 803, and 804 includes seven patch images.

The patch images included in the patch image column 801 includes dots formed on the sheet P by ink discharged from the nozzles N of the row of nozzles L1 and the row of nozzles L2.

The patch images included in the patch image column 802 includes dots formed on the sheet P by ink discharged from the nozzles N of the row of nozzles L2 and the row of nozzles L3.

The patch images included in the patch image column 803 includes dots formed on the sheet P by ink discharged from the nozzles N of the row of nozzles L3 and the row of nozzles L4.

The patch images included in the patch image column 804 includes dots formed on the sheet P by ink discharged from the nozzles N of the row of nozzles L4 and the row of nozzles L1.

The image forming apparatus 1 forms a patch image column for each of the combinations of the row of nozzles L1 and the row of nozzles L2, the row of nozzles L2 and the row of nozzles L3, the row of nozzles L3 and the row of nozzles L4, and the row of nozzles L4 and the row of nozzles L1, used for forming dots adjacent to each other in the width direction 10 on a sheet P.

In the present embodiment, the image forming apparatus 1 forms patch image columns 801, 802, 803, and 804.

As illustrated in FIG. 11, the density of each of the patch images 800 included in the patch image group 80 varies.

The closer and thinner the color of the patch image 800 is to the color of the sheet P, the lower the density of the patch image 800.

For example, if the color of the sheet P is white, the closer the color of the patch image 800 to white, the lower the density of the patch image 800.

The difference in the density of the patch image 800 is generated when the ink is discharged from the nozzles N and lands on the sheet P to form two dots and the two dots merge into one dot.

In the present embodiment, the two dots merge into one dot means that the two dots merge into one dot on the sheet P.

The shorter the distance between the two dots, the amount the two dots merge increases. Accordingly, the amount of the ink that covers the sheet P decreases, and the color of the sheet P can be easily recognized. Thus, the density of the patch image 800 is lower.

The closer the distance between the adjustment dot which is discharged from the nozzle N corresponding to the adjustment pixel and formed on the sheet P and the reference dot which is discharged from the nozzle N corresponding to the adjustment pixel and formed on the sheet P, the lower the density of the patch image 800 due to the level of merge of the adjustment dot and the reference dot.

Figure 12:
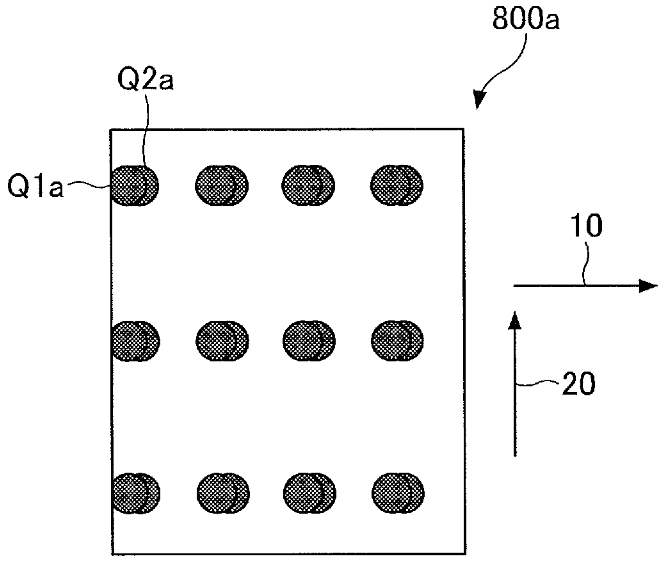
FIG. 12 is a diagram illustrating a patch image based on the patch image data of FIG. 8, according to an embodiment of the present disclosure.

FIG. 12 is a diagram illustrating a patch image 800*a* formed on a sheet P based on the patch image data 700*a* of FIG. 8, according to the present embodiment.

A reference dot Q1*a* formed corresponding to the base pixel M1*a* and an adjustment dot Q2*a* formed corresponding to the adjustment pixel M2*a* are formed at positions close to each other. Accordingly, the reference dot Q1*a* and the adjustment dot Q2*a* merge into one dot.

Accordingly, as illustrated in FIG. 11, the density of the patch image 800*a* is the lowest among seven patch images included in the patch image column 801.

This means that a shift of the timing at which the ink is discharged from the nozzles in the row of nozzles L2 with respect to the row of nozzles L1 is a shift of 0 pixels in the conveyance direction 20, i.e., no deviation.

Figure 13:
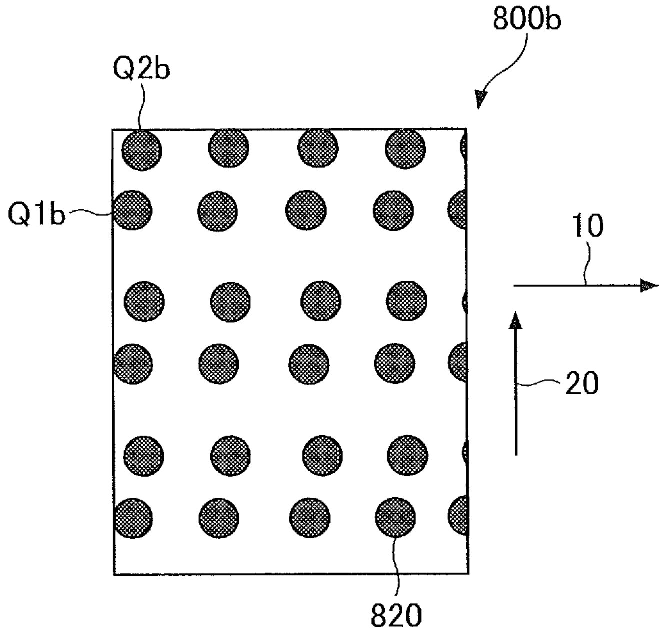
FIG. 13 is a diagram illustrating a patch image formed on a sheet based on the patch image data of FIG. 9, according to an embodiment of the present disclosure.

FIG. 13 is a diagram illustrating a patch image 800*b* formed on a sheet P based on the patch image data 700*b* of FIG. 9, according to the present embodiment.

The reference dot Q1*b* formed corresponding to the base pixel M1*b* and the adjustment dot Q2*b* formed corresponding to the adjustment pixel M2*b* are formed at positions distant from each other. Accordingly, the reference dot Q1*b* and the adjustment dot Q2*b* do not merge into one dot. Accordingly, as illustrated in FIG. 11, the density of the patch image 800*b* is the highest among the seven patches included in the patch image column 801.

Figure 14:
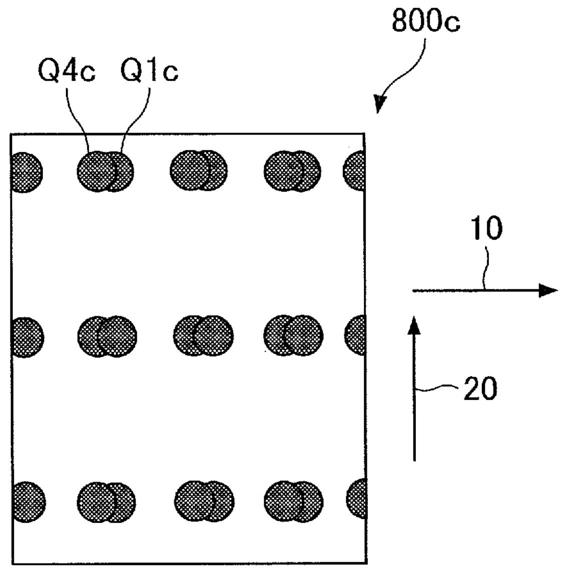
FIG. 14 is a diagram illustrating a patch image based on the patch image data of FIG. 10, according to an embodiment of the present disclosure.

FIG. 14 is a diagram illustrating a patch image 800*c* formed on a sheet P based on the patch image data 700*c* of FIG. 10, according to the present embodiment.

The reference dot Q4*c* formed corresponding to the base pixel M4*c* and the adjustment dot Q1*c* formed corresponding to the adjustment pixel M1*c* are formed at positions close to each other. Accordingly, the reference dot Q4*c* and the adjustment dot Q1*c* merge into one dot.

For this reason, as illustrated in FIG. 11, the density of the patch image 800*c* is the lowest among seven patch images included in the patch image column 804.

This means that the timing at which the ink is discharged from the nozzles N of the row of nozzles L1 with respect to the row of nozzles L4 is shifted by two pixels toward downstream in the conveyance direction 20.

Figure 15:
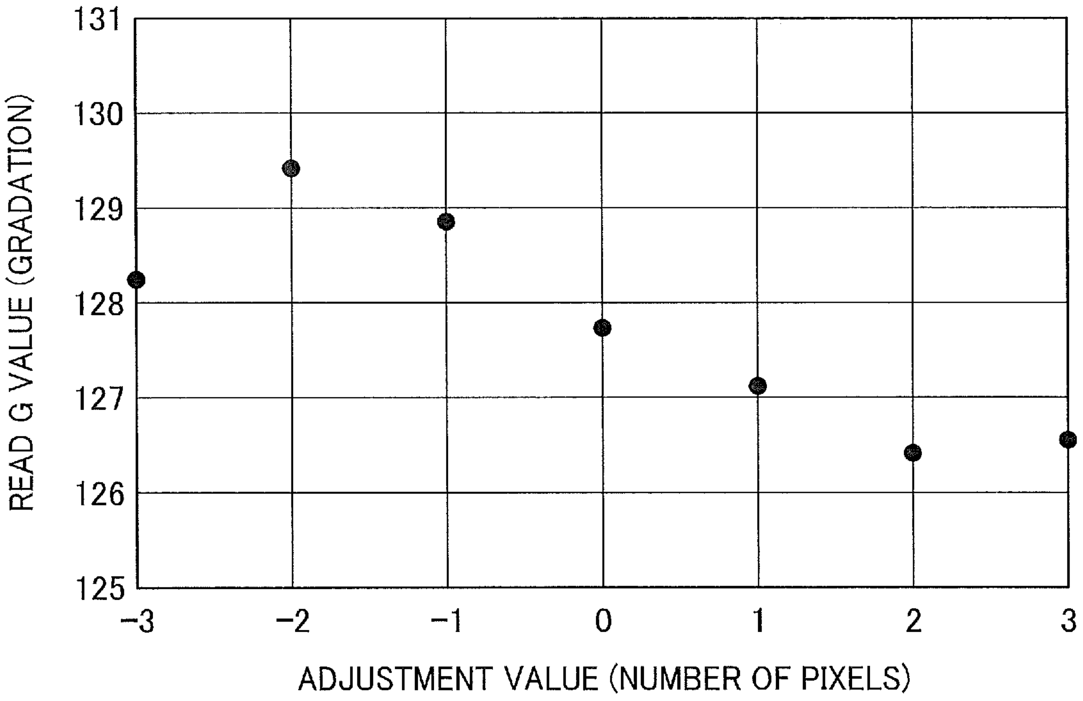
FIG. 15 is a graph illustrating a relation between adjustment values and read G values, according to the first embodiment of the present disclosure.

FIG. 15 is a graph illustrating the relation between adjustment values and read G values, according to the present embodiment.

FIG. 15 is a graph illustrating a result of which the in-line sensor 230 has read each patch image included in the patch image column 804 in the patch image group 80 of FIG. 11.

The adjustment value represented by the horizontal axis in FIG. 15 indicates the number of pixels in which each of the adjustment pixels is shifted from a corresponding one of the base pixels in the conveyance direction 20.

The unit of the adjustment value is pixels.

"−" in the adjustment value represents a position downstream in the conveyance direction 20, and "+" represents a position upstream in the conveyance direction 20.

A plotted dot corresponding to the adjustment value −3 corresponds to the patch image included in a patch image row 805 in FIG. 11.

Similarly, a plotted dot corresponding to adjustment value −2 corresponds to a patch image included in a patch image row 806, a plotted dot corresponding to adjustment value −1 corresponds to a patch image included in a patch image row 807, and a plotted dot corresponding to adjustment value 0 corresponds to a patch image included in a patch image row 808.

A plotted dot corresponding to the adjustment value +1 corresponds to a patch image included in a patch image row 809, a plotted dot corresponding to the adjustment value +2 corresponds to a patch image included in a patch image row 810, and a plotted dot corresponding to the adjustment value +3 corresponds to a patch image included in a patch image row 811.

The vertical axis in FIG. 15 represents read G values as read values of G color among the read values of R, G, and B colors output by the in-line sensor 230.

The measurement unit of the read G values is gradation.

In FIG. 15, the read G value at the adjustment value −2 is the largest. For this reason, the result of FIG. 15 indicates that the density of the patch image 800*c* is the lowest among the patch images included in the patch image row 805.

From the result illustrated in FIG. 15, the determining unit 33 detects that the timing at which the ink is discharged from the nozzles in the row of nozzles L1 is shifted by two pixels toward downstream in the conveyance direction 20, that is, delayed by two pixels, with respect to the row of nozzles L4, and determines that the timing at which the ink is discharged from the nozzles in the row of nozzles L1 is to be earlier by two pixels.

As described above, the image forming apparatus 1 that serves as a liquid discharge apparatus according to the present embodiment discharges liquid such as ink onto a sheet P that serves as a recording medium conveyed in the conveyance direction 20.

The image forming apparatus 1 includes the liquid discharge device 220 and the determining unit 33. The liquid discharge device 220 includes the liquid discharge heads 220C, 220M, 220Y and 220K, each having multiple rows of nozzles L1, L2, L3, and L4 from which the nozzles N for discharging the ink are arranged in the width direction 10. The determining unit 33 determines a timing at which the nozzles N of each of the multiple rows of nozzles L1, L2, L3, and L4 discharge the ink based on the density of multiple patch images 800 formed on the sheet P by the ink discharged by the liquid discharge device 220.

Each of the multiple patch images 800 includes the reference dot Q1*a* and the adjustment dot Q2*a*. The reference dot Q1*a* is formed on a sheet P by ink discharged from a nozzle of the row of nozzles L1, i.e., the first nozzle row, corresponding to the base pixel M1*a*. The adjustment dot Q2*a* is formed on the sheet P by the ink discharged from a nozzle of the nozzle row L2, i.e., the second nozzle row, corresponding to the adjustment pixel M2*a* located adjacent to the base pixel M1*a* in the width direction 10 and shifted from the base pixel M1*a* by the number of pixels different for each of the multiple patch images 800 in the conveyance direction 20.

In the conveyance direction 20, each of the adjustment dots such as the adjustment dot Q2*a* is shifted from a corresponding one of the reference dots such as the reference dot Q1*a* by the number of pixels different for each of the multiple patch images 800. Accordingly, the determining unit 33 can determine the timing at which the nozzles of each of the multiple rows of nozzles L1, L2, L3, and L4 discharge the ink based on the density of each of the patch images 800 and by the number of pixels different for each of the multiple patch images 800.

For example, the determining unit 33 can determine the timing at which the nozzles in each of the multiple rows of nozzles L1, L2, L3, and L4 discharge the ink based on the number of pixels by which each of the adjustment pixels is shifted from the corresponding one of the base pixels in the patch image 800 having the lowest density among the multiple patch images 800 formed on the sheet P.

Further, in the present embodiment, each of the base pixels such as the base pixel M1*a* and the corresponding one of the adjustment pixels such as the adjustment pixel M2*a* are adjacent to each other in the width direction 10. Accordingly, the reference dots formed corresponding to the base pixels and the adjustment dots formed corresponding to the adjustment pixels are likely to merge on the sheet P.

For this reason, the density of the patch image 800 changes in accordance with the amount of the shift of the position of the adjustment dots. Accordingly, the determining unit 33 can determine the timing at which the nozzles N of each of the multiple rows of nozzles L1, L2, L3, and L4 discharge the ink based on the density of the patch image 800 formed on the sheet P.

Accordingly, the timing at which the nozzles N of each of the multiple rows of nozzles L1, L2, L3, and L4 discharge the ink can be adjusted to a desired timing. Thus, the quality of an image formed on the sheet P by the image forming apparatus 1 can be ensured.

The ink that is discharged by the liquid discharge device 220 lands on the sheet P to form multiple dots on the sheet P, and the density of the patch image 800 made of the multiple dots changes depending on how much the multiple dots overlap each other. The liquid discharge apparatus utilizes such a change in characteristic described above to determine the timing at which the ink is discharged.

Accordingly, the timing at which the nozzles N of each of the multiple rows of nozzles L1, L2, L3, and L4 discharge the ink can be determined using the in-line sensor 230 as a reading device which is relatively low cost, without using a high-resolution and high-cost measuring device.

Accordingly, the cost of the image forming apparatus 1 can be reduced.

In the present embodiment, the multiple patch images 800 is formed for each of the combinations of the row of nozzles L1 and the row of nozzles L2, the row of nozzles L2 and the row of nozzles L3, the row of nozzles L3 and the row of nozzles L4, and the row of nozzles L4 and the row of nozzles L1 used for forming dots adjacent to each other in the width direction 10 on the sheet P.

For example, each of the patch image columns 801, 802, 804, and 804 includes patch images formed by each of the combinations of the row of nozzles L1 and the row of nozzles L2, the row of nozzles L2 and the row of nozzles L3, the row of nozzles L3 and the row of nozzles L4, and the row of nozzles L4 and the row of nozzles L1, respectively.

Accordingly, the timing at which the ink is discharged can be determined for each of the combinations of the row of nozzles L1 and the row of nozzles L2, the row of nozzles L2 and the row of nozzles L3, the row of nozzles L3 and the row of nozzles L4, and the row of nozzles L4 of the multiple rows of nozzles L1, L2, L3, and L4.

In the present embodiment, the liquid discharge device 220 includes the multiple nozzles N disposed over the entire width of the sheet P in the width direction 10.

Such a configuration as described above allows the image forming apparatus 1 which is a line-type liquid discharge apparatus to determine the timing at which the nozzles in each of the multiple rows of nozzles L1, L2, L3, and L4 discharges the ink.

In the present embodiment, the image forming apparatus 1 includes the in-line sensor 230 and the determining unit 33. The in-line sensor 230 that serves as a reading device reads the multiple patch images 800 formed on the sheet P by the ink discharged by the liquid discharge device 220. The determining unit 33 determines the timing at which the nozzles in each of the multiple rows of nozzles L1, L2, L3, and L4 discharge the ink based on the reading result by the in-line sensor 230. Thus, the density of the multiple patch images 800 can be quantitatively detected, and the timing at which the nozzles N in each of the multiple rows of nozzles L1, L2, L3, and L4 discharge the ink can be automatically determined.

The image forming apparatus 1 can also use, as a reader, an in-line sensor used for, for example, inspecting printed matter or correcting images formed by the image forming apparatus 1.

Such a configuration as described above eliminates a need to newly provide a reader such as the in-line sensor 230 for the image forming apparatus 1 so as to be used by the determining unit 33 for determining the above-described timing. Accordingly, the configuration of the image forming apparatus 1 can be simplified and the cost can be reduced.

In the present embodiment, the in-line sensor 230 includes multiple reading pixels disposed over the entire width of the sheet P in the width direction 10.

Accordingly, the multiple patch images 800 formed at any position of the sheet P in the width direction 10 can be read.

Such a configuration as described above allows the determining unit 33 to determine the timing at which the nozzles N in each of the multiple rows of nozzles L1, L2, L3, and L4 discharge the ink, even when the position on the sheet P on which the patch image 800 can be formed is restricted depending on the intended use of the image forming apparatus 1.

In the present embodiment, the image forming apparatus 1 includes the in-line sensor 230 as a reader. However, the configuration of the image forming apparatus 1 is not limited to such a configuration.

For example, the image forming apparatus 1 may include a spectrophotometer in place of the in-line sensor 230, and the determining unit 33 may determine the timing at which the nozzles N of each of the multiple rows of nozzles L1, L2, L3, and L4 discharge the ink based on a measurement result by the spectrophotometer.

Figure 16:
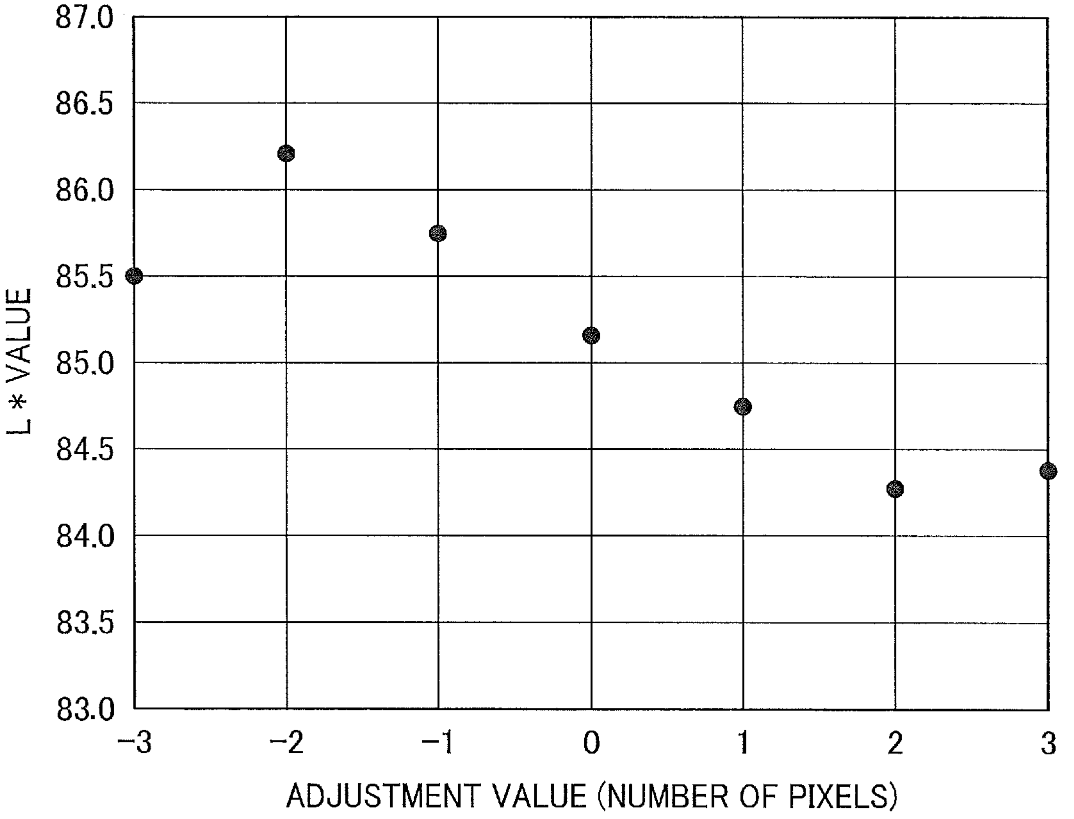
FIG. 16 is a graph illustrating a relation between adjustment values and L* values according to a modification of the present disclosure.

FIG. 16 is a graph illustrating a relation between adjusted values and an L* values (lightness) obtained as measurement results by a spectrophotometer, according to the present embodiment.

FIG. 16 illustrates a result of measuring the color of each of the patch images included in the patch image column 804 of the patch image group 80 illustrated in FIG. 11 by the spectrophotometer, in a similar manner to FIG. 15.

The configuration of FIG. 16 is equivalent to the configuration of FIG. 15. Thus, redundant description of FIG. 16 is omitted below.

In FIG. 16, the L* value at the adjustment value −2 is the highest. Accordingly, the result illustrated in FIG. 16 indicates that the density of the patch image 800*c* is the lowest among the patch images included in the patch image row 805.

From the result illustrated in FIG. 16, the determining unit 33 detects that the timing at which the ink is discharged by the nozzles N of the row of nozzles L1 is shifted by two pixels, i.e., delayed by two pixels toward downstream in the conveyance direction 20 with respect to the row of nozzles L4. Accordingly, the determining unit 33 can determine such that the timing at which the ink is discharged by the nozzles N of the row of nozzles L1 is advanced by two pixels.

Second Embodiment

An image forming apparatus 1*a* according to a second embodiment is described below.

The like components as those in the first embodiment are denoted by the like reference numerals, and the redundant description thereof is omitted as appropriate.

Figure 17:
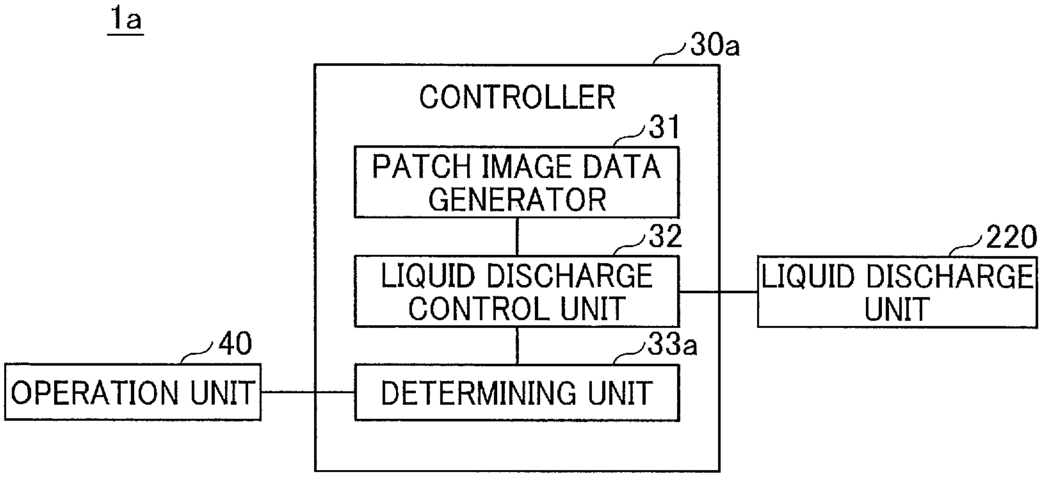
FIG. 17 is a block diagram of a functional configuration of a controller provided for an image forming apparatus, according to a second embodiment of the present disclosure.

FIG. 17 is a block diagram of the functional configuration of a controller 30*a* of the image forming apparatus 1*a*, according to the present embodiment.

As illustrated in FIG. 17, the controller 30*a* includes a determining unit 33*a*.

An operator of the image forming apparatus 1*a*, for example, visually recognizes the multiple patch images 800 formed on the sheet P and inputs data indicating the patch image having the lowest density via the operation panel 40, and the determining unit 33*a* receives the data.

Based on the received information, the determining unit 33*a* determines the timing at which the nozzles N of each of the multiple rows of nozzles L1, L2, L3, and L4 discharge ink.

Such a configuration as described above allows the image forming apparatus 1*a* to determine the timing at which the nozzles N of each of the multiple rows of nozzles L1, L2, L3, and L4 discharge the ink by a simple configuration without including a reader such as an in-line sensor.

The other aspects of the present embodiment are similar to those of the first embodiment of the present disclosure as described above.

Examples of embodiments of the present disclosure have been described above. However, the present disclosure is not limited to such specific embodiments, and various modifications and changes can be made within the scope of the present disclosure.

The liquid discharge apparatus according to the embodiments of the present disclosure is not limited to an image forming apparatus that includes a liquid discharge device for discharging liquid toward a surface to be dried of a recording medium, and that visualizes a meaningful image such as a character or a figure by the discharged liquid.

For example, the liquid discharge apparatus according to the embodiments of the present disclosure may form a pattern having no meaning in itself.

The material of the recording medium is not limited, and any sheet material, for example, paper, thread, fiber, cloth, leather, metal, plastic, glass, wood, and ceramics, to which liquid can temporarily adhere may be used. For example, sheet materials used for film products, cloth products, such as clothing products, building materials, such as a wall sheet or flooring materials, leather products, and the like may be used.

The term "liquid" includes any liquid having a viscosity or a surface tension that is dischargeable from the head. However, preferably, the viscosity of the liquid is not greater than 30 mPa·s under ordinary temperature and ordinary pressure or by heating or cooling.

More specifically, the liquid includes a solvent such as water or an organic solvent, a solution including a coloring agent such as a dye or a pigment, a functionalizing material such as a polymerizable compound, a resin or a surfactant, a biocompatible material such as deoxyribonucleic acid (DNA), amino acid, protein or calcium, edible materials such as natural pigments, or suspension or emulsion. These liquids can be used for ink for inkjet printing and surface treatment liquid, for example.

For example, the image discharge apparatus may be a serial head apparatus that moves a liquid discharge device or a line head apparatus that does not move the liquid discharge device.

The liquid discharge device is a functional component that discharges or jets liquid from discharge holes, i.e., nozzles.

As an energy generation source for discharging liquid, a discharge energy generator can be used, such as a piezoelectric actuator (laminated piezoelectric element or thin-film piezoelectric element), a thermal actuator that employs an electrothermal conversion element, such as a heating resistor, or an electrostatic actuator including a diaphragm and opposed electrodes. However, the discharge energy generator to be used is not limited.

The embodiments of the present disclosure also include a liquid discharge method.

The liquid discharge method according to the embodiments of the present disclosure is, for example, a liquid discharge method performed by a liquid discharge apparatus which discharges liquid to a recording medium conveyed in a conveyance direction.

The liquid discharge apparatus discharges the liquid by a liquid discharge device having multiple rows of nozzles in which multiple nozzles for discharging the liquid are arranged in the width direction perpendicular to the conveyance direction. A determining unit determines the timing at which the nozzles in each of the multiple rows of nozzles discharge the liquid based on the density of multiple patch images formed on the recording medium by the liquid discharged by the liquid discharge device. Each of the multiple patch images includes a reference dot and an adjustment dot. The reference dot is formed on the recording medium by the liquid discharged from a nozzle of a first row of nozzles included in the multiple rows of nozzles corresponding to a predetermined base pixel. The adjustment dot is formed on the recording medium by the liquid discharged from a nozzle of a second row of nozzles included in the multiple rows of nozzles corresponding to an adjustment pixel shifted from the base pixel by the number of pixels that differs for each of the multiple patch images in the conveyance direction. The adjustment dot is adjacent to the base pixel in the width direction.

Such a liquid discharge method can provide effects equivalent to those of the above-described image forming apparatus 1.

The numbers such as ordinal numbers and numerical values that indicate quantity are all given by way of example to describe the technologies to implement the embodiments of the present disclosure, and no limitation is indicated to the numbers given in the above description.

In addition, the description as to how the elements are related to each other, coupled to each other, or connected to each other are given by way of example to describe the technologies to implement the embodiments of the present disclosure, and how the elements are related to each other, coupled to each other, or connected to each other to implement the functionality in the present disclosure is not limited thereby.

For example, the number of patch image data, the number of patch images, the number of pixels included in the patch image data, and the number of dots included in the patch image described in the above embodiments can be appropriately changed depending on, for example, the intended use of the image forming apparatus 1.

The functions of the above-described embodiments may be implemented by one or a plurality of processing circuits.

In the embodiments of the present disclosure, the term "processing circuit or circuitry" includes a programmed processor to execute each function by software, such as a processor implemented by an electronic circuit, and devices, such as an application-specific integrated circuit (ASIC), a digital signal processor (DSP), a field-programmable gate array (FPGA), and components known in the art arranged to perform the recited functions.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A liquid discharge apparatus comprising:

a liquid discharge device including a plurality of rows of nozzles through which liquid is discharged, each of the plurality of rows of nozzles including a plurality of nozzles being arrayed in a width direction of a recording medium orthogonal to a conveyance direction of the recording medium, the liquid discharge device being configured to discharge the liquid to the recording medium conveyed in the conveyance direction; and circuitry configured to determine a timing at which the plurality of nozzles in each of the plurality of rows of nozzles discharge the liquid based on a density of a plurality of patch images formed on the recording medium by the liquid discharged by the liquid discharge device, wherein the density of each of the plurality of patch images differs from other patch images of the plurality of patch images, and wherein each of the plurality of patch images includes:

a reference dot on the recording medium by the liquid discharged from the plurality of nozzles in a first row of the plurality of rows of nozzles, the reference dot corresponding to a prescribed base pixel; and an adjustment dot on the recording medium by the liquid discharged from the plurality of nozzles in a second row of nozzles of the plurality of rows of nozzles, the adjustment dot corresponding to an adjustment pixel adjacent to the base pixel in the width direction, the adjustment pixel being shifted from the base pixel in the conveyance direction by a number of pixels that differs for each of the plurality of patch images, wherein the density of each of the plurality of patch images changes based on how much the reference dot and the adjustment dot overlap with each other.

2. The liquid discharge apparatus according to claim 1, wherein the plurality of patch images are formed for each of combinations of the plurality of rows of nozzles used for forming dots adjacent to each other in the width direction on the recording medium.

3. The liquid discharge apparatus according to claim 1, wherein the liquid discharge device includes the plurality of nozzles over an entire width of the recording medium in the width direction.

4. The liquid discharge apparatus according to claim 1, wherein the liquid discharge apparatus includes a reader configured to read the plurality of patch images on the recording medium by the liquid discharged by the liquid discharge device, and wherein the circuitry is configured to determine the timing at which the plurality of nozzles in each of the plurality of rows of nozzles discharge the liquid based on a reading result by the reader.

5. The liquid discharge apparatus according to claim 4, wherein the reader includes a plurality of reading pixels over an entire width of the recording medium in the width direction.

6. The liquid discharge apparatus according to claim 1, wherein the circuitry is configured to determine the timing based on the number of pixels by which the adjustment pixel is shifted from the base pixel in a patch image having a lowest density among the plurality of patch images on the recording medium.

7. A liquid discharge method comprising:

discharging, by a liquid discharge apparatus, liquid to a recording medium conveyed in a conveyance direction, the liquid discharge apparatus including a liquid discharge device having a plurality of rows of nozzles in each of which a plurality of nozzles for discharging the liquid are arrayed in a width direction orthogonal to the conveyance direction; and determining a timing at which the plurality of nozzles in each of the plurality of rows of nozzles discharge the liquid based on a density of a plurality of patch images formed on the recording medium by the liquid discharged by the liquid discharge device, wherein the density of each of the plurality of patch images differs from other patch images of the plurality of patch images, and wherein each of the plurality of patch images includes:

a reference dot formed on the recording medium by the liquid discharged from a first row of the plurality of nozzles corresponding to a prescribed base pixel; and an adjustment dot formed on the recording medium by the liquid discharged from a second row of the plurality of nozzles corresponding to an adjustment pixel shifted from the base pixel by a number of pixels that differs for each of the plurality of patch images in the conveyance direction, the adjustment dot being adjacent to the base pixel in the width direction, wherein the density of each of the plurality of patch images changes based on how much the reference dot and the adjustment dot overlap with each other.

* * * * *